United States Patent

Gross et al.

[11] Patent Number: 5,947,158
[45] Date of Patent: Sep. 7, 1999

[54] FLEXIBLE INSULATED DUCT AND THE METHOD OF MAKING THE DUCT

[75] Inventors: Stephen Edward Gross, Littleton; Michael Dean Peterson, Parker; Blake Boyd Bogrett, Littleton, all of Colo.

[73] Assignee: Johns Manville International, Inc., Denver, Colo.

[21] Appl. No.: 09/123,907

[22] Filed: Jul. 28, 1998

[51] Int. Cl.$^6$ ............................................. F16L 9/14
[52] U.S. Cl. .................. 138/149; 138/156; 138/158; 138/153; 248/36.4
[58] Field of Search .................... 138/149, 156, 138/158, 172, 153; 248/35.9, 36.4

[56] References Cited

U.S. PATENT DOCUMENTS

| | | | |
|---|---|---|---|
| 2,962,402 | 11/1960 | Sweeney | 138/158 X |
| 3,817,804 | 6/1974 | Helmick et al. | 156/144 |
| 3,857,590 | 12/1974 | Meeker | 138/155 X |
| 4,023,589 | 5/1977 | Rejeski | 138/149 |
| 4,025,680 | 5/1977 | Botsolas et al. | 138/149 X |
| 4,400,228 | 8/1983 | Gentry | 138/121 X |
| 4,410,014 | 10/1983 | Smith | 138/149 |
| 5,154,605 | 10/1992 | Suey | 138/158 X |

*Primary Examiner*—Patrick Brinson
*Attorney, Agent, or Firm*—Robert D. Touslee

[57] ABSTRACT

An insulated air duct includes a flexible, reinforced, inner tubular core; a layer of partially compressed flexible, resilient fibrous insulation surrounding the core; and a flexible jacket, preferably with a longitudinally extending seam, spaced outwardly from the core and enveloping the layer of partially compressed fibrous insulation. The layer of partially compressed fibrous insulation is formed from a resilient blanket of air laid, randomly oriented, entangled fibers. The resilient blanket may have a low binder content or be binderless with the fibers unbonded and, possibly, lubricated. The lubricant on the fibers facilitates the sliding of the fibers relative to each other, reduces fiber attrition due to abrasion as the fibers move relative to each other; and enhances the resilience of the blanket when subjected to compression whereby the layer of compressed fibrous insulation surrounding the core remains expanded in its partially compressed state, to the extent permitted by a space between the core and the jacket, to provide the duct with good insulating properties and to exert an outward pressure on the jacket to improve the appearance of the jacket. Preferably, the resilient blanket is wrapped about the core while being supported on the jacket so that the blanket will not pull apart during the wrapping process.

17 Claims, 2 Drawing Sheets

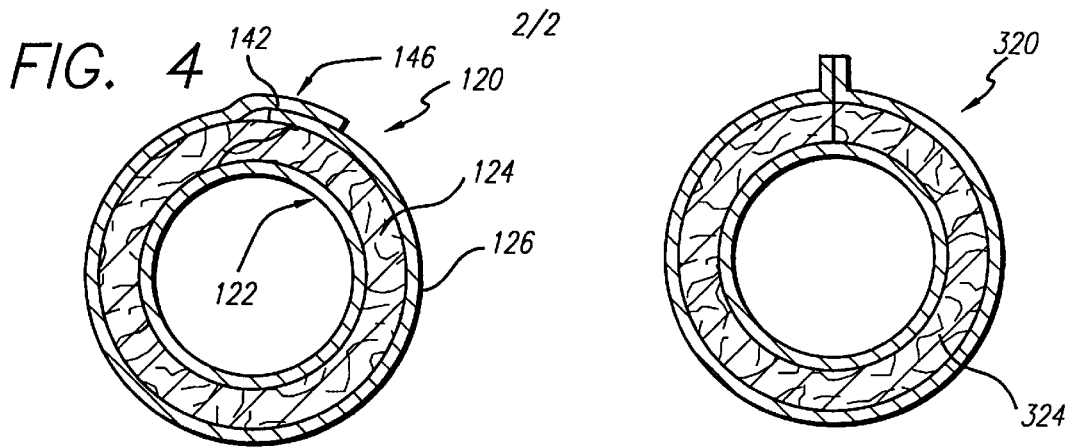
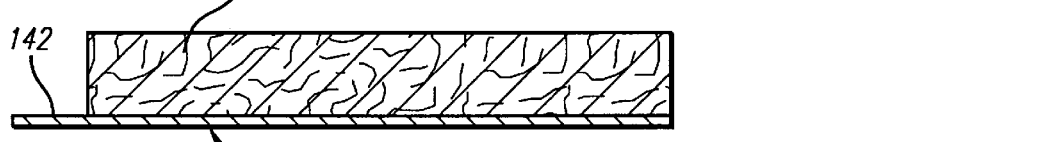
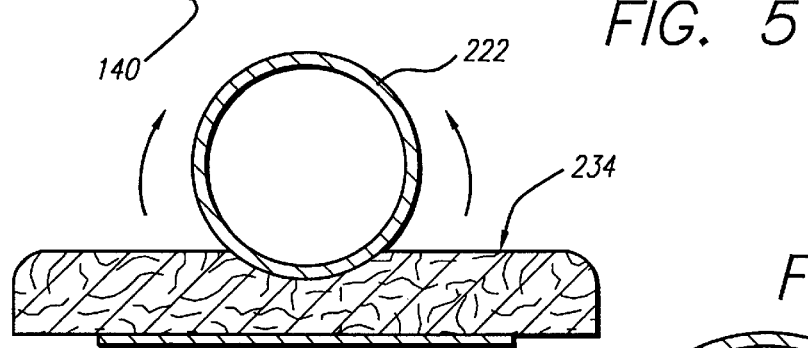
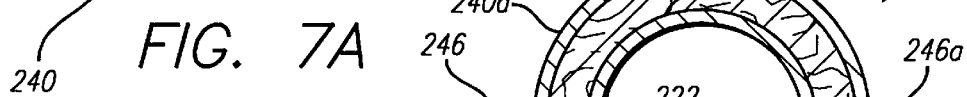
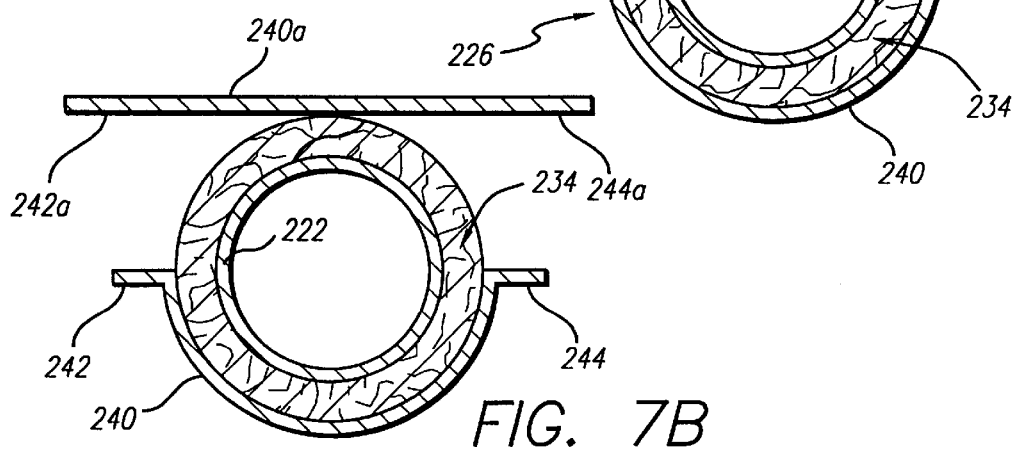

FLEXIBLE INSULATED DUCT AND THE METHOD OF MAKING THE DUCT

BACKGROUND OF THE INVENTION

The present invention is directed to insulated air ducts and air connectors (hereinafter referred to as "air ducts") and, in particular, to flexible insulated air ducts including a highly resilient fibrous insulation of air laid, randomly oriented, entangled fibers and the method of making such an air duct in a continuous operation. Preferably, the fibers of the highly resilient fibrous insulation are not bonded to each other at their points of intersection and are lubricated.

Insulated, flexible air ducts are in common use in commercial, industrial and residential heating, ventilating and air conditioning systems. These air ducts typically comprise a reinforced, flexible, tubular core having a wire helix with spaced convolutions enveloped in a plastic film. The flexible core is surrounded by a layer of fibrous insulation, such as glass fiber insulation, and a vapor barrier jacket or sleeve of relatively thin, flexible or pliable, limp polymeric film envelops the fibrous insulation.

The fibrous insulation frequently used as the insulation layer in flexible air duct is an air laid blanket of randomly oriented, entangled glass fibers. These blankets have a binder content ranging from 6% to 15% by weight, typically ranging from 7% to 9% by weight, with the glass fibers being bonded together at their points of intersection by the binder which typically is a phenolic resin. While such fibrous insulation blankets exhibit good insulating properties and integrity, these fibrous insulation blankets lack the degree of resilience and expansiveness to fully fill the spacings between the tubular cores and the thin, flexible, limp polymeric film jackets and exert the necessary outward forces on the jacket of the air ducts that creates a substantially smooth, wrinkle free, aesthetically pleasing exterior surface for the air ducts. These fibrous insulation blankets, while exhibiting good insulating properties, also lack the degree of resilience and expansiveness required to reduce the density of the blanket required to obtain the insulating properties required for such air ducts. Thus, there has been and is a need to form such air ducts with fibrous insulation blankets that are sufficiently resilient and expansive to create air ducts with relatively smooth, wrinkle free exterior surfaces and the required insulating properties at lower insulation densities.

Under present practice, the flexible, cylindrical, 10 reinforced tubular cores (typically in pre-cut twenty-five foot sections), the rolls of fibrous insulation blanket, and the jacket material are manufactured at different locations and formed into insulated air ducts at a fabrication shop where the flexible, insulated ducts are assembled in sections (typically is twenty-five feet in length), packaged and forwarded to either distributors or heating, ventilating and air conditioning contractors. At the fabrication shop, the rolls; of fibrous insulation blanket are sized in width to the circumferences of the tubular cores being insulated and in length to the lengths of the tubular cores being insulated. Then, the sized insulation blankets are wrapped about the tubular cores and jacketed to form the flexible insulated air ducts either by pulling the jacket material, in tubular form, over the insulation wrapped tubular cores, such as shown in FIG. 9 of U.S. Pat. No. 3,817,804; issued Jun. 18, 1974; and entitled "Method and Apparatus for Fabricating flexible Tubing" or by wrapping sheets of the jacket material about the insulation wrapped tubular cores, and sealing the free edges of the jacket material to form one longitudinally extending seam along the length of air duct such as shown in U.S. Pat. No. 4,410,014; issued Oct. 18, 1983; and entitled "Flexible Insulated Air Duct". Typically, the jacket material used is a vapor barrier material. If required, a layer of scrim material can also be interposed between the layer of fibrous insulation and the tubular core or between the layer of fibrous insulation and the jacket for additional strength.

The current practice of shipping the separate components of the flexible, insulated air ducts to a fabrication shop and assembling the flexible, insulated air ducts at the fabrication shop is inefficient and labor intensive. Typically, the rolls of insulation blanket and the jacket material are each manufactured at different locations, packaged, and shipped to the fabrication shops. There the rolls of insulation blanket and the jacket material are unpackaged, inventoried, and later formed around inner tubular cores into insulated air ducts. The air ducts are then packaged and shipped to the contractor who unpackages the air ducts for installation. Clearly, there is a need to reduce the separate packaging, shipping, handling and inventory costs involved in the present practice of assembling flexible insulated air duct at fabrication shops.

SUMMARY OF THE INVENTION

The present invention is directed to flexible, insulated air ducts and an in line process for manufacturing the insulated, flexible air ducts which solves the problems discussed above in connection with current insulated, flexible air ducts and assembly practices.

The flexible, insulated air duct of the present invention includes a flexible, reinforced, inner tubular core; a layer of partially compressed flexible, resilient fibrous insulation surrounding the core; and a flexible jacket spaced outwardly from the core and enveloping the layer of partially compressed resilient fibrous insulation. Preferably, the flexible jacket is made from a thin, limp polymeric sheet material which may be reinforced with a scrim or other material and is impermeable or substantially impermeable to water vapor and thus, the jacket functions as a vapor barrier for the insulated air duct.

The layer of partially compressed resilient fibrous insulation is formed from a resilient blanket of air laid, randomly oriented, entangled fibers. These resilient blankets may have low binder contents, less than 4% binder by weight, or the blankets may be binderless with the fibers within the blanket unbonded and, in certain embodiments, lubricated. Preferably, the fibers are glass fibers and when used, the lubricant on the fibers: facilitates the sliding of the fibers relative to each other within the blanket; reduces fiber attrition within the blanket due to abrasion as the fibers move relative to each other; and enhances the resilience of the blanket when subjected to compression whereby the layer of partially compressed resilient fibrous insulation surrounding the reinforced tubular core remains expanded, in its partially compressed state, to the extent permitted by a space between the reinforced tubular core and the jacket formed around the layer of partially compressed resilient fibrous insulation, to provide the air duct with the required insulating properties at lower blanket densities and to exert an outward pressure on the jacket to improve the appearance of the jacket.

As mentioned in the preceding paragraph, in one embodiment of the present invention, rather than bonding the fibers together within the blanket (e.g. with a phenolic binder), the highly resilient fibrous blanket used to form the layer of partially compressed insulation within the air duct relies on the fiber entanglement of the randomly oriented fibers within the blanket to hold the fibers together within the blanket.

Since the resilient fibrous blanket used to form the layer of partially compressed insulation in the this embodiment does not contain a binder, the use of this resilient fibrous blanket to form the insulation layer in the air duct may result in a significant cost savings. The binder free nature of this fibrous blanket eliminates the need for curing ovens thereby reducing capital requirements and the energy costs and emission problems associated with oven curing operations. The cost of binders is also eliminated, although this cost savings would be off set somewhat by the cost of any lubricants used in this embodiment. In addition, the white color of these binderless blankets enhances the appearance of the insulated air duct.

The greater resilience of the resilient fibrous blanket of unbonded or binderless, lubricated fibers when compared to fibrous blankets of bonded, unlubricated fibers may result in another cost savings. The greater expansiveness of the resilient fibrous blanket should enable this blanket to exhibit insulating properties or R-values, at lower densities, equivalent to those of the higher density bonded fibrous insulation blankets currently used in insulated air ducts.

Ideally, the insulated, flexible air duct manufacturing operation would be located immediately adjacent the "cold end" or downstream end of the fibrous insulation blanket manufacturing line and would permit the fabrication of insulated, flexible air ducts of various lengths and diameters to accommodate the heating, ventilating and air conditioning contractor's requirements. Preferably, the flexible, reinforced tubular cores would be manufactured adjacent the cold end of the fibrous insulation blanket production line by a continuous process currently used to manufacture such tubular cores. The sheet of jacket material would be manufactured in a conventional extrusion process adjacent the cold end of the insulation blanket manufacturing line or supplied from rolls of jacket material located adjacent the cold end of the insulation blanket manufacturing line.

In the preferred method of the present invention, the flexible, reinforced tubular cores, in continuous lengths or cut to the lengths desired for the air ducts being manufactured, are introduced into a wrapping station adjacent the cold end of the fibrous insulation blanket production line. The resilient fibrous low binder content or binderless blanket of air laid, randomly oriented, entangled fibers coming off of the production line is cut to a width at least equal to and preferably greater than the outer circumference of the tubular core and laid on a sheet of flexible jacket material which is preferably impervious or substantially impervious to water vapor. Preferably, in embodiments of the invention using only a single sheet of jacket material, the sheet of jacket material has a width greater than the resilient fibrous blanket and the resilient fibrous blanket is either centered on the sheet of jacket material to form longitudinally extending sealing tabs on either side of the resilient fibrous blanket or located off-center to form a single longitudinally extending sealing tab on one side of the resilient fibrous blanket. In a third, double seam embodiment, the resilient fibrous blanket is wider than the each sheet of jacket material and is preferably centered on one of the sheets of jacket material prior to wrapping the blanket about the core.

When making the air duct, the resilient fibrous blanket is supported on a sheet of flexible jacket material as the resilient fibrous blanket and the sheet of flexible jacket material are wrapped about the reinforced tubular core with the resilient fibrous blanket being compressed between the reinforced tubular core and the sheet of jacket material. In the first embodiment, the tabs of the sheet of jacket material are brought together and sealed to each other to form a single, longitudinally extending double layer tab seam in the jacket formed about the insulation wrapped reinforced tubular core. In the second embodiment the single tab overlaps and is sealed to the opposite edge portion of the sheet of jacket material to form a longitudinally is extending overlapping seam in the jacket formed about the insulation wrapped reinforced tubular core. In the third embodiment, the tabs of both sheets of jacket material are brought together and sealed to each other to form two, longitudinally extending double layer tab seams in the jacket formed about the insulation wrapped reinforced tubular core.

Once the jacket is made, the resilient fibrous insulation, in its partially compressed state, exerts outwardly directed forces on the jacket. While the jacket is preferably made from a sheet or sheets of jacket material wrapped and sealed about the insulation layer covering the inner tubular core, as described above, the jacket may also be formed from a tubular sheet of jacket material that is drawn over the insulation wrapped, reinforced inner tubular core.

BRIEF DESCRIPTION OF THE DRAWINGS

FIG. 4 is a schematic transverse cross section through the insulated air duct of the present invention with a single longitudinally extending, overlapping jacket seam.

FIG. 5 is a transverse cross section showing the placement of the insulation blanket on the sheet of jacket material when forming the insulated air duct of FIG. 4.

FIG. 6 is a schematic transverse cross section through the insulated air duct of the present invention wherein the jacket is formed with a pair of opposed, longitudinally extending, outwardly projecting, double layer tab seams.

FIGS. 7A and 7B are schematic transverse sections setting forth the fabrication steps involved in the method or the present invention for forming the air duct of FIG. 6.

FIG. 8 is a schematic transverse cross section through an insulated air duct of the present invention wherein the ends of the blanket forming the insulation layer of the air duct abut rather than overlap.

DESCRIPTION OF THE PREFERRED EMBODIMENTS

Figure 1:
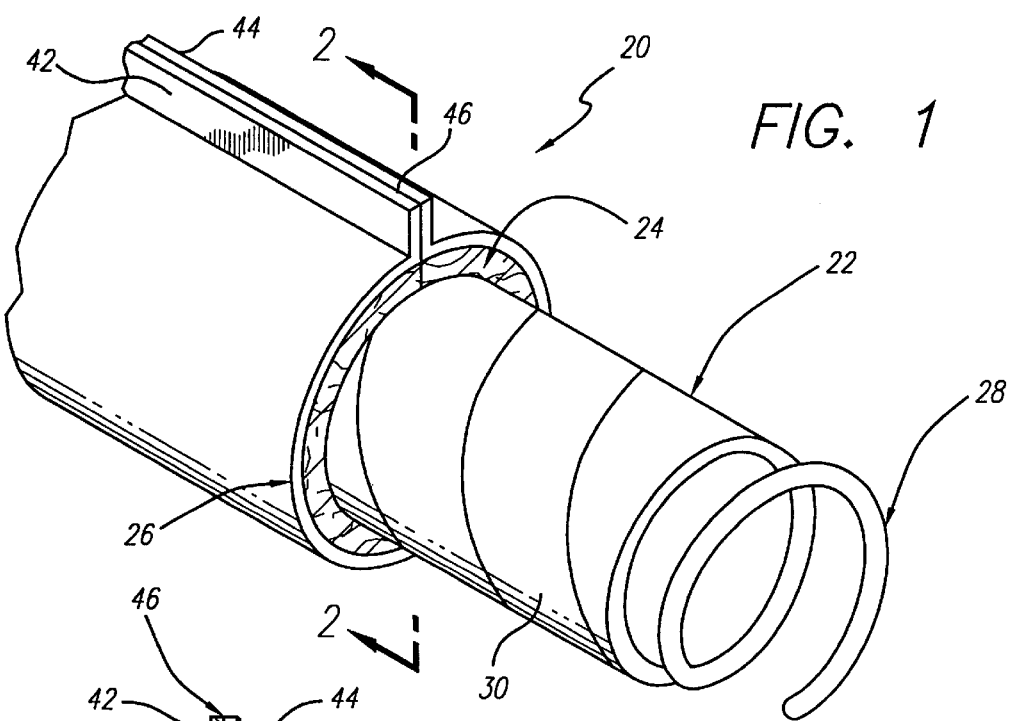
FIG. 1 is a schematic perspective view of the flexible, insulated air duct of the present invention wherein the jacket is formed with a longitudinally extending, outwardly projecting double layer tab seam and with portions of the insulated air duct stripped away to better show the structure of the insulated air duct.
Figure 2:
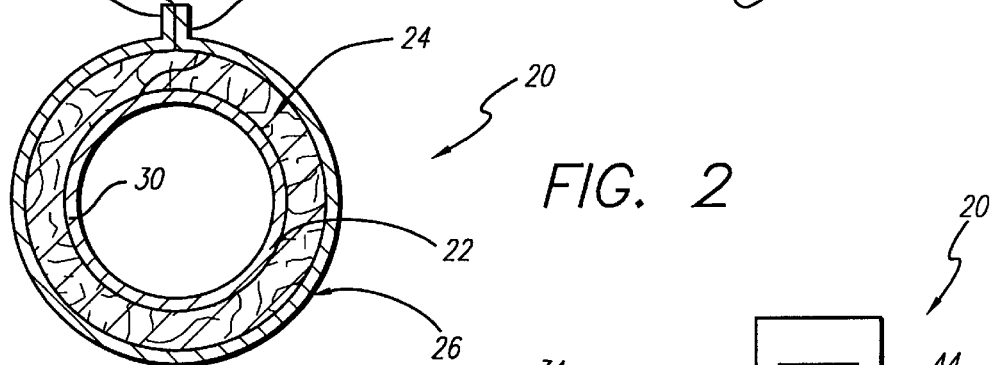
FIG. 2 is a schematic transverse cross section through the insulated air duct of FIG. 1, taken substantially along lines 2—2 of FIG. 1.

As shown in FIGS. 1 and 2, the flexible, insulated air duct 20 of the present invention comprises a flexible, reinforced tubular core 22 which is generally round or oval in transverse cross section; a layer of flexible, resilient fibrous insulation 24 surrounding the flexible, reinforced tubular core 22; and a jacket 26, preferably, made from a sheet of vapor barrier material, enveloping the layer of fibrous insulation 24. The flexible, reinforced tubular cores 22 of the flexible, insulated air ducts 20 are normally between four inches and twenty inches in diameter with the most common air ducts having core diameters of either six inches or eight inches. The layer of fibrous insulation 24 is typically between about one and about three inches thick and has an R-value of about 4.2, 6 or 8.

Preferably, the flexible, reinforced tubular core 22 comprises a wire helix 28 with spaced successive convolutions and a polymeric core film 30 enveloping and/or bonded to the wire helix. The wire helix 28 can be formed from spring steel or other, preferably flexible, resilient hard wire materials to provide the flexible, insulated air duct 20 with the reinforcement required for its service requirements. The polymeric core film 30 is typically made from a two to six inch wide, helically wound, strip of polyester or other polymeric film. While the wire helix can be located on the inside of and bonded to the polymeric core film, typically, the wire helix 28 is located between the overlapping, lateral portions of successive convolutions of the strip of polymeric core film 30. The overlapping, lateral portions of successive convolutions of the helically wound strip of polymeric film 30 are typically bonded together with a standard water based adhesive or otherwise bonded together by heat or solvent welding so that the polymeric core film 30 will not unravel and the wire helix 28 is held in place. The flexible, reinforced tubular core 22 is manufactured on conventional commercially available core fabricating equipment and the method of forming the flexible, reinforced tubular core 22 with the equipment is conventional.

The layer of fibrous insulation 24 comprises a strip 34 of resilient, flexible fibrous insulation blanket, preferably a glass fiber blanket, which is wrapped about the flexible, reinforced tubular core 22. The strip 34 of fibrous insulation blanket has a width substantially equal to, equal to or somewhat greater than the outer circumference of the tubular core 22 so that there is little or no gap between the lateral edges of the insulation strip 34 and, preferably, an overlapping of the lateral edges of the insulation strip 34 when it is wrapped about the reinforced tubular core 22.

The fibrous insulation blanket from which the strip 34 of fibrous insulation blanket is formed is a resilient, flexible blanket of air laid, randomly oriented, entangled fibers which has a low binder content, a binder content of less than 4% by weight, or is binderless. In the binderless embodiment of the blanket, the air laid, randomly oriented, entangled fibers are unbonded at their points of intersection and may have a lubricant thereon. When used in the binderless blanket, the lubricant facilitates the sliding of the fibers relative to each other within the blanket; reduces fiber attrition due to abrasion as the entangled fibers move relative to each other; and enhances the resilience of the blanket when subjected to compression whereby the layer of compressed fibrous insulation surrounding the inner tubular core fills and remains expanded, in its partially compressed state, to an extent permitted by the space between the inner reinforced tubular core and the vapor barrier jacket. The resilience of the strip 34 of fibrous insulation blanket may provide the air duct 20 with the required insulating properties at lower densities and exert an outward pressure on an inner surface of the jacket 26 to give the jacket: a smoother, relatively wrinkle free outer surface and provide the duct with a more aesthetically pleasing appearance.

In its uncompressed state the fibrous blanket 34 has a density between about 0.35 and about 1.5 pounds per cubic foot (hereinafter "pcf") + or −10%; preferably, has a density between about 0.35 and about 0.85 pcf + or −10%; and most preferably has a density between about 0.35 about 0.50 pcf + or −10%. With respect to the density ranges for the fibrous blanket 34 set forth in the previous sentence, it should be noted that, due to the expansive nature of these blankets, exact measurements of the densities of the uncompressed fibrous blankets 34 are difficult to obtain and thus, a tolerance of + or −10% has been utilized. As the fibrous insulation layer 24 within the air duct 20, the partially compressed insulation blanket 34 has a density between about 0.5 pcf and about 1.6 pcf and preferably, between about 0.5 and about 1 pcf. While the resilient fibrous blanket 34 can be made from other fibers having the required physical properties, preferably, the resilient fibrous blanket is made from glass fibers having a mean fiber diameter between about 1 microns and about 6 microns.

The resilient fibrous blanket 34 of randomly oriented, entangled fibers can be formed by air laying glass fibers, formed by a rotary fiberization process on a collection surface, such as a collection chain conveyor passing through a collection chamber. The resilient fibrous blanket 34 of randomly oriented, entangled fibers can also be formed by air laying glass fibers, produced by other fiberization processes, such as flame attenuation processes like a pot and marble flame attenuation process, wherein continuous filaments of molten glass are drawn from a series of melting pots by pull rolls and introduced into the hot, high velocity combustion gases coming from a series attenuation burners. The hot, high velocity combustion gases from the burners attenuate the continuous filaments and transform the filaments into individual fibers which are carried by the combustion gases to a collection chain conveyor to form the blanket.

While small amounts of binder (up to about 4% by weight of the blanket formed) may be applied to the fibers, in one embodiment of the insulation blanket 34 used in the present invention, binder is not applied to the fibers forming the insulation blanket 34 during the collection process and the fibers of the insulation blanket 34 are not bonded together. In this embodiment of the insulation blanket 34 used in the flexible, insulated air duct of the present invention, the fibers of the insulation blanket 34 may be coated with a lubricant: to make the fiber surfaces slippery and facilitate movement of the randomly oriented, entangled fibers relative to each other within the blanket; reduce fiber attrition due to abrasion; and improve the resilience of the blanket relative to blankets wherein the fibers are bonded together at their points of intersection. Preferably, the lubricant is applied to the glass fibers while the fibers are still airborne within the collection chamber by spraying the lubricant onto the airborne fibers as the fibers are drawn toward the collection surface.

The lubricants applied to the fibers are lubricants or lubricating oils normally used in the glass textile or sliver industry, not the glass fiber insulation industry, such as but not limited to non-ionic petroleum derivative fiber finishes. Preferably, the resilient, fibrous blanket is between 0.1% and 1.0% lubricant by weight and most preferably about 0.25% lubricant by weight.

Preferably, the jacket 26 includes a strip 40 of flexible, limp polymeric film jacket material such as a metalized polyester film, a polyethylene film, or an equivalent polymeric film commonly used for flexible, insulated air ducts and may be reinforced with a scrim. The flexible, limp polymeric film is, preferably, impervious or substantially impervious to the passage of water vapor whereby the jacket functions as a vapor barrier for the air duct 20. The strip 40 of polymeric film jacket material has a length equal to or substantially equal to the length of the reinforced tubular core 22 of the air duct 20 and a width greater than the width of the fibrous insulation strip 34 to form the longitudinally extending lateral tabs 42 and 44 which are used to seal the jacket material about the insulation wrapped, reinforced tubular core 22. The tabs 42 and 44 of the polymeric film jacket material are adhesively bonded or ultrasonically, heat or solvent welded together to form the vapor barrier jacket 26. The seam formed by the sealed tabs 42 and 44 is a longitudinally extending double layer tab seam 46 which, as shown in FIGS. 1 and 2, projects outwardly from the outer surface of the flexible, insulated air duct 20. This projecting tab seam 46 provides a means for readily securing hangers, fasteners and the like to the flexible, insulated air duct 20 when the air duct is installed in a building.

Figure 3A:
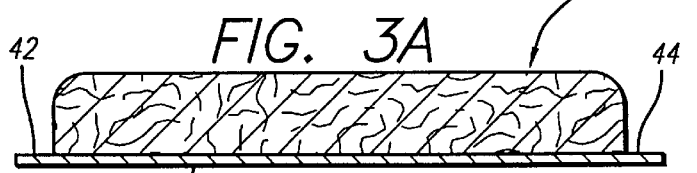
FIGS. 3A–3C are schematic transverse sections setting forth the fabrication steps involved in the method of the present invention for forming the air duct of FIGS. 1 and 2.
Figure 3B:
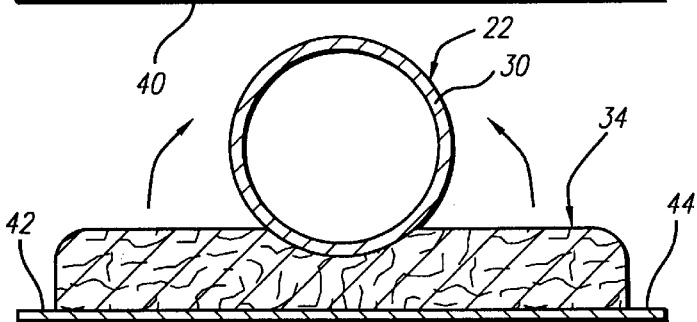
Figure 3C:
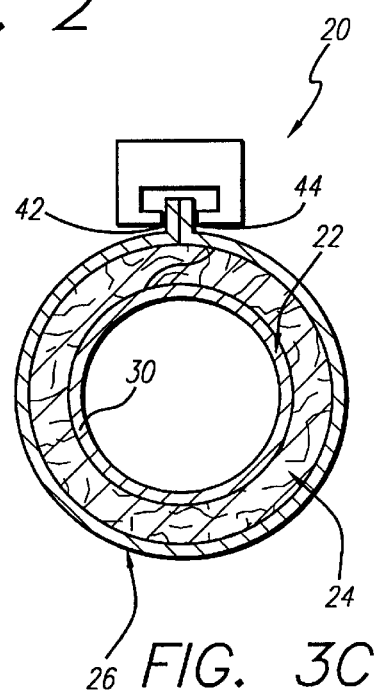

Referring now to FIGS. 3A–3C and as discussed above in the brief description of the invention, the method of manufacturing the flexible, insulated air ducts 20 of the present invention includes the use of flexible, reinforced tubular cores 22, having generally circular or oval transverse cross sections, like the flexible, reinforced tubular cores currently used in flexible, insulated air ducts. Preferably, the flexible, reinforced tubular cores 22 are manufactured adjacent the cold end of the fibrous insulation blanket production line by one of the continuous processes currently used to manufacture such tubular cores wherein a tubular core comprising a spirally or helically wound reinforcing wire enveloped within a helically wrapped polymeric film exits the core fabricating machine as a continuous length of flexible tubular core. The reinforced tubular cores 22, formed in the core fabricating machine, in either continuous lengths or cut to a desired length (typically about twenty-five feet), are placed in or introduced or fed into a wrapping station.

A resilient fibrous blanket 34 of air laid, randomly oriented, entangled fibers, coming off the end of the production line or from a roll of the resilient fibrous blanket, is cut to a width substantially equal to, equal to or preferably greater than the outer circumference of the reinforced tubular core 22. If the reinforced tubular core 22 has been cut to a desired length, the resilient fibrous blanket 34 is cut to a length equal to or substantially equal to the length of the reinforced tubular core. Since the resilient fibrous blanket 34 has very little binder bonding the fibers together within the blanket or since the fibers in the blanket 34 are unbonded and in some embodiments lubricated, the resilient fibrous blanket 34 may lack the integrity or tensile strength required for handling and wrapping the resilient fibrous blanket about the reinforced tubular core. Accordingly, in the preferred method of the present invention, to ensure that the resilient fibrous blanket 34 does not pull apart during the wrapping process, the resilient fibrous blanket 34 is supported on the sheet 40 of jacket material used to form the jacket 26 of the air duct while the resilient fibrous blanket 34 and the sheet 40 are being wrapped about the reinforced tubular core 22 with the blanket compressed between the sheet 40 and the reinforced tubular core 22.

The sheet 40 of flexible jacket material provided is either continuous or sized to a length equal to or substantially equal to the length of the reinforced tubular core 22 and sized to a width greater than that of the resilient fibrous, blanket 34. Preferably, the sheet 40 of flexible jacket material is limp and substantially impervious or impervious to water vapor. As shown in FIG. 3A, the resilient fibrous blanket 34 is centered on the sheet of flexible jacket material (the longitudinal centerlines of the insulation blanket 34 and the sheet 40 of jacket material are aligned or substantially aligned) to form longitudinally extending sealing tabs 42 and 44 on either side of the resilient fibrous blanket. The resilient fibrous blanket 34 is supported on the sheet 40 of flexible jacket material as the resilient fibrous blanket and the sheet of flexible jacket material are wrapped about the reinforced tubular core with the resilient fibrous blanket 34 being compressed between the reinforced tubular core 22 and the sheet 40 of jacket material. At the same time, the tabs 42 and 44 of the sheet 40 of jacket material are brought together to form a longitudinally extending seam and sealed to each other, e.g. by adhesive bonding, ultrasonic, heat or solvent welding, to form the jacket 26 about the reinforced tubular core 22 and the resilient fibrous insulation layer 24 wrapped about the reinforced tubular core.

Since the tubular core 22 is reinforced, the expansive, resilient fibrous insulation layer 24, in its partially compressed state, fully fills the annular space between the reinforced tubular core 22 and the jacket 26 and exerts an outwardly directed force on the jacket to give the jacket a smoother, more wrinkle free outer surface. The expansiveness of the resilient fibrous insulation layer 24 within the annular space between the reinforced tubular core 22 and the jacket 26 may also reduce the blanket density required to provide the necessary insulation properties for the insulation layer when compared to the less expansive insulation blankets of bonded fibers previously used in flexible air ducts.

With the method of the present invention, fully fabricated, flexible insulated air duct sections of the desired lengths and diameters can be shipped to the heating, ventilating and air conditioning distributors and contractors for inventory or installation. There is less packaging, shipping, unpackaging and handling of the air duct components and by manufacturing the air duct adjacent the end of the fibrous insulation production line rather than at a fabrication shop, the insulation forming the insulation layer does not need to go through an additional compression prior to the fabrication of the air duct which may adversely affect the recovery of the insulation and thus the insulating properties of the insulation. In summary, the method of the present invention is a more economical and efficient manufacturing process which solves many of the problems enumerated above in connection with current insulated flexible air duct fabricating procedures.

FIG. 4 shows an embodiment 120 of the flexible, insulated air duct of the present invention which has a jacket 126 with a longitudinally extending, overlapping seam 146. As with the flexible insulated air duct 20 of FIGS. 1 and 2, the flexible, insulated air duct 120 of the present invention includes a flexible, reinforced tubular core 122 which is generally round or oval in transverse cross section; a layer of flexible, resilient fibrous insulation 124 surrounding the flexible, reinforced tubular core 122; and the jacket 126, preferably, made from a sheet of vapor barrier material, enveloping the layer of fibrous insulation 124.

Other than the type of longitudinally extending seam used to form the jacket 126 about the insulation wrapped inner tubular core, the flexible, insulated air duct 120 of FIG. 4 is the same as the flexible insulated air duct 20 of FIGS. 1 and 2 and the components of the flexible insulated air duct 120, e.g. the reinforced inner tubular core 122, the insulation blanket 134 and the sheet 140 of jacket insulation material, are the same as those used in the flexible insulated air duct 20. Since other than the lone exception noted above, the structures of the air ducts 20 and 120 are the same, the detailed description relating to the structure of the flexible, insulated air duct of the present invention and its components set forth above in connection with the embodiment of FIGS. 1 and 2 will not be repeated.

The method of making the flexible, insulated air duct 120 is the same as the method of making the flexible, insulated air duct 20, with the following exceptions. Rather than centering the insulation blanket 134 on the sheet of jacket material 140, the insulation blanket 134 is placed on the sheet of jacket material off-center as shown in FIG. 5 (the longitudinal centerlines of the insulation blanket 134 and the sheet 140 of jacket material are not aligned or substantially aligned) to form only one tab 142. When the insulation blanket 134 and the sheet 140 of jacket material are wrapped about the inner tubular core 122, the single tab 142 overlays and is sealed or otherwise bonded to the outer surface of the opposite, longitudinally extending lateral edge portion of the sheet 140 of jacket material to form the single tab overlap seam 146.

FIG. 6 shows an embodiment 220 of the flexible, insulated air duct of the present invention which has a jacket 226 with a pair of longitudinally extending, double layer tab seams 246a and 246b which project outwardly form the outer surface of the flexible, insulated air duct 220. As with the flexible insulated air duct 20 of FIGS. 1 and 2, the flexible, insulated air duct 220 of the present invention includes a flexible, reinforced tubular core 222 which is generally round or oval in transverse cross section; a layer of flexible, resilient fibrous insulation 224 surrounding the flexible, reinforced tubular core 222; and the jacket 226, preferably, made from a sheet of vapor barrier material, enveloping the layer of fibrous insulation 224.

Other than the jacket 226 enveloping the insulation wrapped inner tubular core, the flexible, insulated air duct 220 of FIG. 6 is the same as the flexible insulated air duct 20 of FIGS. 1 and 2 and the components of the flexible insulated air duct 220, e.g. the reinforced inner tubular core 222, the insulation blanket 234 and jacket insulation material, are the same as those used in the flexible insulated air duct 20. Accordingly, the detailed description relating to these components set forth above in connection with the embodiment of FIGS. 1 and 2 will not be repeated.

The method of making the flexible, insulated air duct 220 differs somewhat from the method of making the flexible, insulated air duct 20. Rather than using only a single sheet of jacket material greater in width than the insulation blanket 234, the jacket of the insulated air duct 220 is made from two sheets of jacket material 240 and 240a, each less in width than the insulation blanket. Preferably, the insulation blanket 234 is centered on the sheet of jacket material 240 as shown in FIG. 7A (the longitudinal centerlines of the insulation blanket 134 and the sheet 140 of jacket material are aligned or substantially aligned). After the insulation blanket 234 and the sheet 240 of jacket material are wrapped about the inner tubular core 222 with the insulation material compressed, as shown in FIG. 7B, the second sheet 240a of jacket material is also wrapped about the compressed insulation material. Lateral edge tabs 242 and 244 of the first sheet of jacket material and lateral edge tabs 242a and 244a on the second sheet of jacket material are then brought together and bonded or otherwise sealed together to form a pair of tabs 246 and 246a projecting outwardly from the outer surface of flexible air duct 220.

FIG. 8 shows a flexible insulated air duct of the present invention 320 which is identical to the flexible insulated air duct 20 of FIGS. 1 and 2, with one exception, rather than having the edges of the resilient blanket of insulation 324 overlap as in the air ducts of FIGS. 1, 2, 4 and 6, the lateral edges of the resilient insulation blanket 324 abut or nearly about to leave little or no gap in the insulation.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A flexible, insulated air duct comprising:
   a flexible, reinforced, inner tubular core; a layer of partially compressed flexible fibrous insulation surrounding the inner tubular core; and a flexible jacket spaced outwardly from the inner tubular core and enveloping the layer of partially compressed fibrous insulation; and
   the layer of partially compressed flexible fibrous insulation comprising a resilient blanket of air laid, randomly oriented, entangled, fibers which are not bonded at their points of intersection; the blanket having an uncompressed density of less than 1.5 pcf; and the layer having a density between about 0.5 pcf and about 1.6 pcf.

2. The flexible, insulated air duct according to claim 1, wherein: the fibers of the resilient blanket have a lubricant thereon to facilitate the sliding of the fibers relative to each other, reduce fiber attrition due to abrasion as the fibers move relative to each other; and enhance the resilience of the blanket when subjected to compression whereby the layer of partially compressed fibrous insulation surrounding the inner tubular core fills and remains expanded in its partially compressed state, to an extent permitted by a space between the inner tubular core and the jacket, to provide the duct with good insulating properties and to exert an outward pressure on an inner surface of the jacket to provide the air duct with a good appearance.

3. The flexible, insulated air duct according to claim 2, wherein: the flexible jacket has a sealed, longitudinally extending seam extending substantially the entire length of said flexible insulated air duct.

4. The flexible, insulated air duct according to claim 3, wherein: the seam comprises a longitudinally extending tab extending outwardly from an outer surface of the flexible insulated air duct.

5. The flexible, insulated air duct according to claim 3, wherein: the seam comprises a longitudinally extending overlapping tab sealed to an outer surface of a longitudinally extending jacket edge portion to form a overlapping seam.

6. The flexible, insulated air duct according to claim 1, wherein: the blanket has an uncompressed density between about 0.35 pcf and about 0.85 pcf and the layer of compressed fibrous insulation has a density between about 0.5 pcf and about 1 pcf.

7. The flexible, insulated air duct according to claim 1, wherein: the fibers are glass fibers having a mean fiber diameter between about 1 microns and about 6 microns.

8. The flexible insulated air duct according to claim 1, wherein: the layer of compressed fibrous insulation has an R-value between about 4.2 and about 8.

9. A flexible, insulated air duct comprising:
   a flexible, reinforced, inner tubular core; a layer of partially compressed flexible fibrous insulation surrounding the inner tubular core; and a flexible, limp vapor barrier jacket spaced outwardly from the inner tubular core and enveloping the layer of partially compressed fibrous insulation; and
   the layer of compressed flexible fibrous insulation comprising a resilient blanket of air laid, randomly oriented, entangled, glass fibers which are not bonded at their points of intersection; the resilient blanket having an uncompressed density between about 0.35 pcf and about 0.85 pcf and the layer of compressed fibrous insulation having a density between about 0.5 pcf and about 1.6 pcf; the glass fibers having a lubricant thereon to facilitate the sliding of the fibers relative to each other, reduce fiber attrition due to abrasion as the fibers move relative to each other; and enhance the resilience of the blanket when subjected to compression whereby the layer of partially compressed fibrous insulation surrounding the inner tubular core fills and remains expanded in its partially compressed state, to the extent permitted by a space between the inner tubular core and the vapor barrier jacket, to provide the duct with good insulating properties and to exert an outward pressure on an inner surface of the vapor barrier jacket to provide the air duct with a good appearance.

10. The flexible, insulated air duct according to claim 9, wherein: the flexible jacket has a sealed, longitudinally extending seam extending substantially the entire length of said flexible insulated air duct.

11. A flexible, insulated air duct comprising:

a flexible, reinforced, inner tubular core; a layer of partially compressed flexible fibrous insulation surrounding the inner tubular core; and a flexible jacket spaced outwardly from the inner tubular core and enveloping the layer of partially compressed fibrous insulation; and the layer of partially compressed flexible fibrous insulation comprising a resilient blanket of air laid, randomly oriented, entangled, fibers; the blanket having a binder content of less than 4% by weight and an uncompressed density of less than 1.5 pcf; and the layer having a density between about 0.5 pcf and about 1.6 pcf.

12. The flexible, insulated air duct according to claim 11, wherein: the flexible jacket has a sealed, longitudinally extending seam extending substantially the entire length of said flexible insulated air duct.

13. The flexible, insulated air duct according to claim 12, wherein: the seam comprises a longitudinally extending tab extending outwardly from an outer surface of the flexible insulated air duct.

14. The flexible, insulated air duct according to claim 12, wherein: the seam comprises a longitudinally extending overlapping tab sealed to an outer surface of a longitudinally extending jacket edge portion to form a overlapping seam.

15. The flexible, insulated air duct according to claim 11, wherein: the blanket has an uncompressed density between about 0.35 pcf and about 0.85 pcf and the layer of compressed fibrous insulation has a density between about 0.5 pcf and about 1 pcf.

16. The flexible, insulated air duct according to claim 11, wherein: the fibers are glass fibers having a mean fiber diameter between about 1 microns and about 6 microns.

17. The flexible insulated air duct according to claim 11, wherein: the layer of compressed fibrous insulation has an R-value between about 4.2 and about 8.

* * * * *